United States Patent Office 3,531,711
Patented Sept. 29, 1970

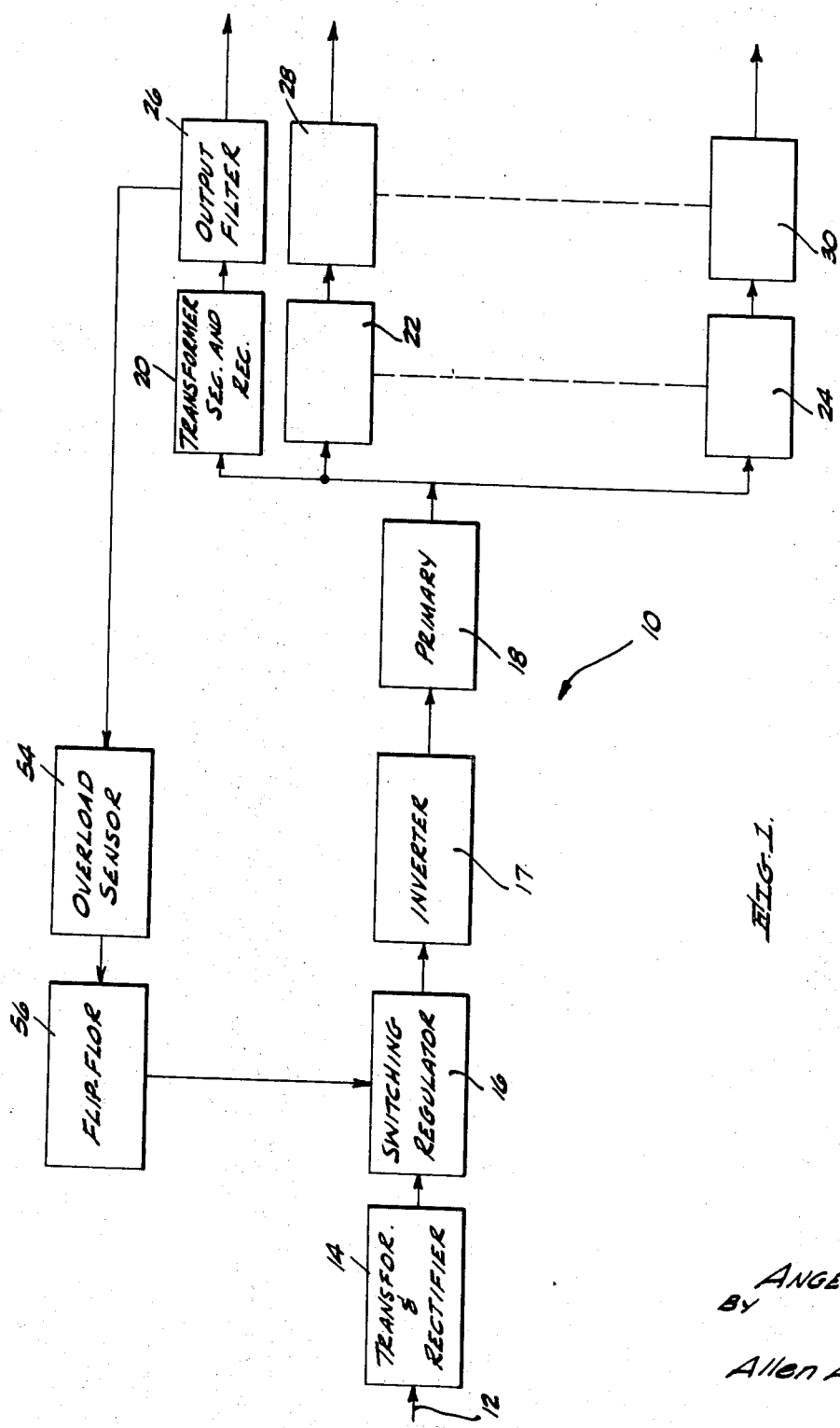

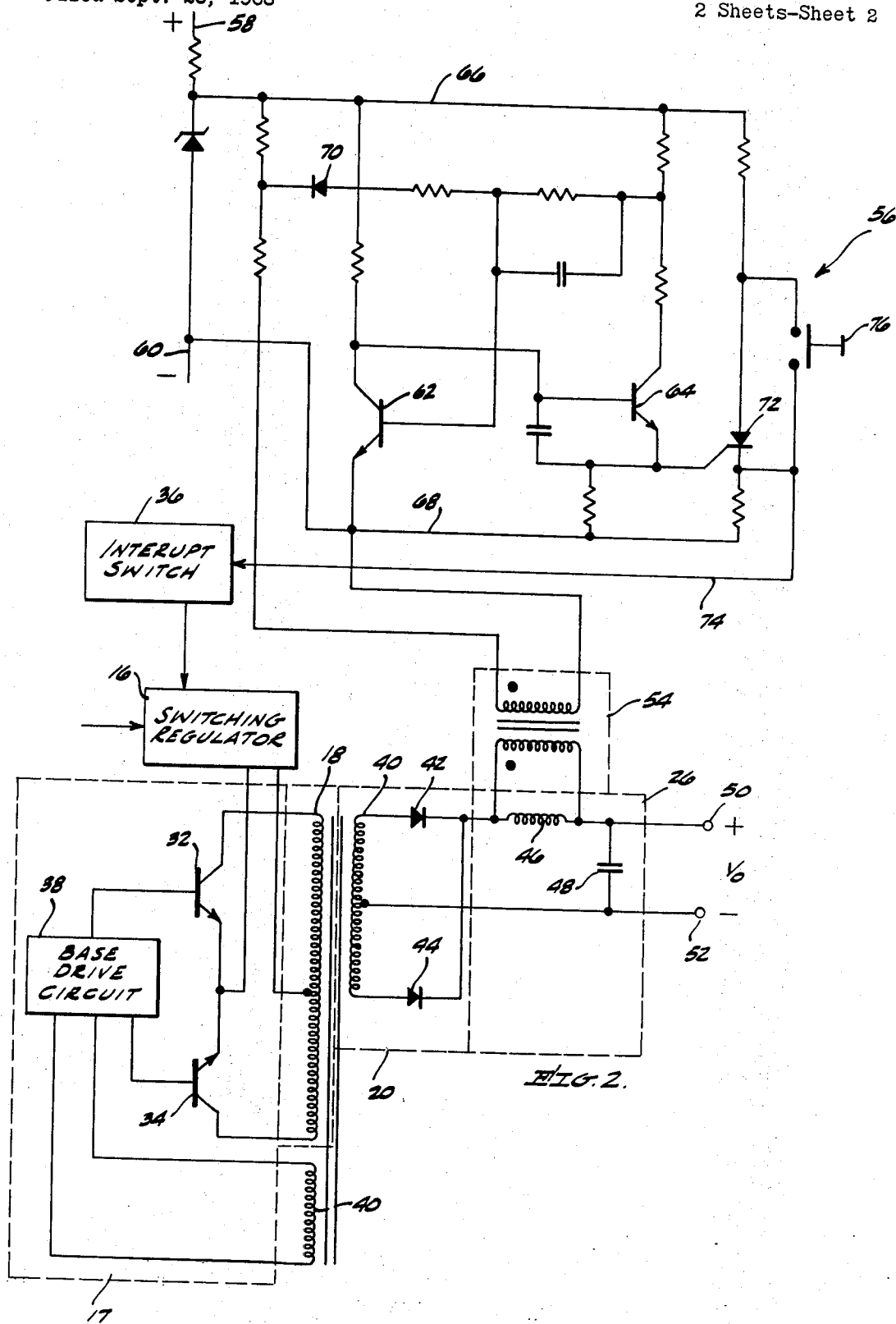

3,531,711
OVERLOAD SENSING CIRCUIT FOR INVERTER
TRANSFORMER OUTPUT
Angelo Fusco, Santa Monica, Calif., assignor to Hughes Aircraft Company, Culver City, Calif., a corporation of Delaware
Filed Sept. 23, 1968, Ser. No. 761,878
Int. Cl. H02h 7/10; H02m 1/18
U.S. Cl. 321—14                           4 Claims

ABSTRACT OF THE DISCLOSURE

When a square wave transformer output is rectified by semiconductor diodes, the spacing between adjacent pulses is a function of transformer current and recovery time of the diodes. This pulse spacing is detected, and when it exceeds the critical value, it signals overload. This overload signal interrupts supply to the transformer. Even when the transformer has a plurality of secondaries, overload in any one secondary will cause pulse spacing signaling in each secondary circuit so that only one detecting device is necessary for detecting overloads in any one of the plurality of secondaries.

---

The invention herein described was made in the course of or under a contract or subcontract thereunder, with the U.S. Navy, Department of Defense.

BACKGROUND

This invention is directed to an overload sensing device to prevent overloading of rectifier circuits.

Overload sensing is old, and fuses, as well as many other devices and detectors have been employed to disconnect a circuit upon overload. In the art of power conditioning, particularly for the supplying of well controlled voltages at a number of different voltage levels, prior overload sensing has measured current to a transformer primary which was suitable for supplying a plurality of secondaries having different voltage outputs. Thus, when one of the plurality of output circuits was overloaded, the signal which represented an overload in an individual circuit would be only an increment of increased current at the transformer primary. Thus, no significant increase in primary current was detected until the transformer current in a particular secondary was excessive. In most cases, this is too much of an overload in any one particular output circuit with the result that the particular circuit was damaged by overload.

SUMMARY

In order to aid in the understanding of this invention, it can be stated in essentially summary form that it is directed to an overload sensing circuit for inverter transformer outputs, particularly where the inverter supplies the primary of the transformer having at least one secondary, which secondary is connected to rectifiers. The space between pulses is detected, and when this becomes excessive, power to the inverter is terminated.

Accordingly, it is an object of this invention to provide an overload sensing device for inverter transformer outputs where an inverter supplies a transformer primary and a transformer secondary receives its energization thereby, and where the transformer secondary signal is rectified and the width between pulses is measured as an indication of rectifier load. It is a further object wherein the rectifier supplied by the secondary is a semiconductor diode rectifier wherein the pulse spacing is a function of load so that the pulse spacing can be used as a load signal. It is another object wherein the pulse spacing representing the rectifier load is used to control the power supply thereto. It is still another object to provide an overload sensing device wherein a plurality of secondaries are supplied by a primary energized with substantially a square wave, with each of the secondaries having its output rectified by semiconductor diodes so that the rectified pulse spacing is a signal representative of secondary load so that such pulse spacing can be detected at any one of the secondaries to indicate overload at any of the secondaries. Other objects and advantages of this invention will become apparent from a study of the following portion of the specification, the claims and the attached drawings.

BRIEF DESCRIPTION OF THE DRAWINGS

FIG. 1 is a block diagram showing how the overload sensing device for inverter transformer outputs is employed in a multiple power supply circuit.

FIG. 2 is an electrical schematic showing the details of the overload sensing device.

DESCRIPTION

Refering to FIG. 1, a circuit which incorporates the overload sensing device of this invention is generally indicated at 10. The circuit 10 comprises an input alternating current line 12 which may be unregulated as to frequency or voltage, or both. The input AC line supplies the power for the load, as is hereinafter described. Module 14 is connected to receive power from line 12 and includes a transformer for transforming the voltage into the correct range. It also includes a rectifier for rectifying the transformer output so that the output from transformer and rectifier module 14 is a direct current of unregulated voltage.

Switching regulator 16 is supplied by module 14. It includes appropriate switching circuits and control circuits for switching the voltage, preferably at a known frequency, so that its average value is at a fixed, and desired level. Switching regulator 16 preferably operates at the frequency of inverter 17 and regulates its DC output voltage by pulse width control. Its output is filtered. The output of switching regulator 16 is supplied to inverter 17.

Inverter 17 receives the regulated DC current from switching regulator 16 and inverts it into AC current at a known and reasonably fixed frequency. Thus, the output of inverter 17 is at fixed frequency and voltage. The output of inverter 17 is connected to primary 18.

A plurality of secondaries arre connected to be electromagnetically energized by primary 18. Any reasonable number of secondaries may be employed, the number corresponding to the output voltage requirements. Since the frequency and average voltage into primary 18 are fixed, the secondaries energized by primary 18 have a voltage output in accordance with the turns ratio. Each of the secondaries is equipped with suitable rectifiers and output filters so that a DC voltage is available in each output. Transformer secondary-rectifier combination modules are generally indicated at 20, 22, and 24. These modules respectively feed output filters which are generally indicated at 26, 28, and 30. As indicated in FIG 1, any reasonable number of secondaries, rectifiers and output filters can be energized by primary 18 to supply different voltage requirements.

Referring to FIG. 2, the inverter 17 is illustrated as having power transistors 32 and 34 which are connected to the supply coming from switching regulator 16, through interrupt switch 36 and the center tapped primary 18. Base drive circuit 38 is connected to transistors 32 and 34, and receives a signal from secondary winding 40 to maintain the average voltage on primary 18 at the desired level. Furthermore, the base drive circuit 38 maintains the frequency of operation of inverter 17 reasonably constant to eliminate problems resulting from frequency change.

Module 20 is illustrated as having a transformer secondary 40 which is center tapped and has its ends connected through semiconductor diodes 42 and 44. The rectified output is filtered by means of an LC circuit composed of inductor 46 and capacitor 48 to supply power at a fixed voltage from supply terminals 50 and 52. As indicated previously, a reasonable number of modules 20 and 26 can be employed to supply the requisite output voltages.

Since the input to primary 18 is essentially square wave, and the slope of the sides of the wave form is determined only by the rise and fall time of the transistors 32 and 34, and thus are substantially upright, the output of transformer secondary 40 is also of substantially square wave form, having only a slight side wall slope. Rectification of this wave form by semiconductor diodes 42 and 44 would result in a constant voltage, providing rectification was perfect and the wave form was perfect. However, it is inherent in these devices that concentration of majority carriers during forward conduction results in a short circuit upon application of the inverse voltage in the reversed direction so that there is a reverse current short circuit until the majority carriers are depleted. The length of time that this reverse current flows is a function of the amplitude of the forward current. Thus, a semiconductor diode 42 normally rated at six amperes, and operating at five amperes, will leave a notch between positive pulses of about 400 nanoseconds when the semiconductor diodes 42 and 44 are designed for fast recovery, such as General Electric Company Part No. 1N3880. However, when overload occurs due to a substantial short circuit at or beyond supply terminals 50, and current goes up to eight amperes, the notch between positive going pulses goes up to two microseconds.

This change in notch width between the positive going pulses is detected and is employed to indicate when overload occurs, to cause disconnect before overload can cause substantial damage. This notch between positive going pulses appears across inductor 46, and the primary of pulse transformer 54 is connected thereacross. The secondary of pulse transformer 54 is connected to flip-flop circuit 56.

Power is connected to flip-flop circuit 56 at points 58 and 60. Transistors 62 and 64 are connected between the positive and the negative power buses 66 and 68 in flip-flop arrangement. The secondary of pulse transformer 54 has one side connected to negative power bus 68 and its other side connected through resistors and diode 70 to transistor 62. The arrangement is such that when there is a steady state voltage upon the primary of pulse transformer 54, the biasing of transistor 62 is such that it is in the conductive, on condition and this on condition in turn holds transistor 64 in its non-conducting, off condition. Additionally, the off condition of transistor 64 holds SCR 72 in its non-conducting condition. Signal line 74 connects the output of SCR 72 to interrupt switch 36 so that as long as SCR 72 is off, corresponding to an off condition of transistor 64, interrupt switch 36 is on to permit power to be supplied into the remainder of the switching regulator 16.

Polarities are such that when a notch appears between positive pulses across inductor 46, the notch causes current flow in the conductive direction through diode 70, which is in turn connected to the base of transistor 62 to tend to turn transistor 62 to the off condition. However, the characteristics of the components of the circuit are such that the transistor 62 does not get turned off by a notch of 400 nanoseconds, which is normal spacing between positive going pulses. This is because of normal circuit constants and the storage time of transistor 62 and diode 70.

However, when the space between positive going pulses at the input to inductance 46 becomes sufficiently large to indicate an overload condition, this longer space between positive going pulses is sufficient to turn off transistor 62. Such turn off results in raising the base voltage on transistor 64 to cause it to go conductive. With transistor 64 conducting, the base bias on transistor 62 is made more negative to hold it in the non-conductive condition, until it is reset. When transistor 64 is turned on, the gate of SCR 72 is made sufficiently positive for it to become conducting, and this in turn introduces a positive signal in signal line 74 which is used to operate interrupt switch 36 to stop the supply of power to the power transistors of switching regulator 16. Thus, the circuit supplied by terminals 50 and 52 is protected from overcurrents, modules 20 and 17 are protected against overload, and output filter 26 is protected against overload. The turn on of SCR 72 acts as the hold to shut off the circuit until reset. Since the SCR 72 will remain conducting until bus 66 is shut off, or by momentary closure of switch 76, it acts to hold the circuit off until reset.

A single detector circuit, comprised of the pulse width detector circuit which is shown in the form of a flip-flop circuit 56, is sufficient to indicate overload on any of the secondaries 20 through 24. It is not necessary that a pulse transformer and detector circuit be connected to additional secondaries driven by the primary 18. If any one of the secondaries carries excessive load, the longer reverse current through the overloaded semiconductor diode represents a short circuit in that secondary to indicate an overload in that circuit. This reverse short circuit current through the overloaded diode is sufficient to affect the entire magnetic circuit so that the same is indicated through the magnetic circuit into module 20. This overcurrent signal is transmitted through output filter 26 and pulse transformer 54 into the pulse width detector circuit 56. Since the circuit 56 controls the input power to the primary, an overload in any one of the secondaries thus causes interruption of the power to the primary with the resultant cutoff of all secondaries, including the overloaded circuit.

This invention having been disclosed in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A power supply having an overload sensing device and power interrupting means connected to interrupt current from said power supply, said power supply comprising:
   a transformer secondary, first and second semiconductor diode rectifiers connected to said transformer secondary to supply a rectified output voltage comprising a plurality of pulses having spaces therebetween, the space width between pulses being a function of the current in said semiconductor diode rectifiers;
   a pulse transformer connected to the output of said semiconductor diode rectifiers, and a transistor normally biased into the conducting state connected to said pulse transformer so that spaces between rectified pulses at the output of said rectifiers tend to cause said transistor to become non-conducting, said transistor being connected to said power supply so that, when said transistor becomes non-conducting, said interrupting means interrupts current from said power supply.

2. The power supply of claim 1 wherein said transistor is part of a flip-flop circuit connected to said power interrupting means to control said power supply.

3. A power supply having an overload sensing device and power interrupting means connected to interrupt current from said power supply, said power supply comprising:

a transformer secondary, first and second semiconductor diode rectifiers connected to said transformer secondary to supply a rectified output voltage comprising a plurality of pulses having spaces therebetween, the space width between pulses being a function of the current in said semiconductor diode rectifiers;

a transformer primary in association with said transformer secondary, said power supply including switching means connected to said transformer primary to cause substantially square wave voltage pulses to be impressed on said transformer primary so that the rectified voltage from said semiconductor rectifiers comprises a plurality of closely-spaced, substantially square waves, said power interrupting means being connected to said transformer primary;

a pulse transformer connected to the output of said semiconductor diode rectifiers, and a transistor normally biased into the conducting state connected to said pulse transformer so that spaces between rectified pulses at the output of said rectifiers tend to cause said transistor to become non-conducting, said transistor being connected to said power supply so that, when said transistor becomes non-conducting, said interrupting means interrupts current from said power supply.

4. The power supply of claim 3 wherein said transistor is part of a flip-flop circuit connected to said power interrupting means to control said power supply.

References Cited

UNITED STATES PATENTS

| | | | |
|---|---|---|---|
| 3,193,752 | 7/1965 | Ellsworth | 321—14 X |
| 3,243,725 | 3/1966 | Raposa et al. | 321—2 X |
| 3,377,540 | 4/1968 | Meyer | 321—14 X |
| 3,403,318 | 9/1968 | Krauthamer et al. | 321—18 X |
| 3,412,313 | 11/1968 | Compoly | 321—14 |

J D MILLER, Primary Examiner

W. H. BEHA, Jr., Assistant Examiner

U.S. Cl. X.R.

317—33; 321—2, 27